United States Patent
Kuo

(10) Patent No.: US 7,218,674 B2
(45) Date of Patent: May 15, 2007

(54) METHOD AND DEVICE FOR CONTROLLING QUANTIZATION SCALES OF A VIDEO ENCODING BIT STREAM

(75) Inventor: Chih-Hui Kuo, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 366 days.

(21) Appl. No.: 10/904,420

(22) Filed: Nov. 9, 2004

(65) Prior Publication Data

US 2005/0100090 A1  May 12, 2005

(30) Foreign Application Priority Data

Nov. 10, 2003  (TW) ............................... 92131385 A

(51) Int. Cl.
H04N 7/12 (2006.01)

(52) U.S. Cl. ............................................... 375/240.03

(58) Field of Classification Search .................. None
See application file for complete search history.

(56) References Cited

U.S. PATENT DOCUMENTS 6,560,282 B2 * 5/2003 Tahara et al. .......... 375/240.02
7,126,993 B2 * 10/2006 Kitamura et al. ...... 375/240.26

* cited by examiner

Primary Examiner—Paul W. Huber
(74) Attorney, Agent, or Firm—Winston Hsu

(57) ABSTRACT

A method for controlling quantization scales when encoding video signals, includes: obtaining a number of changes in the quantization scales of within a time period; generating a new quantization scale; and comparing the number of changes with a predetermined value to determine whether to replace a prior quantization scale with the new quantization scale; wherein when the number of changes exceeds the predetermined value, retain the prior quantization scale instead of replacing it with the new quantization scale.

21 Claims, 3 Drawing Sheets

METHOD AND DEVICE FOR CONTROLLING QUANTIZATION SCALES OF A VIDEO ENCODING BIT STREAM

BACKGROUND

The invention relates to methods and devices for controlling quantization scales of video signals, and more particularly, to methods and devices for controlling quantization scales of video signals in a video encoding device.

According to MPEG (moving picture coding experts) 2 standard, an image is compressed by eliminating spatial redundancies by chrominance sampling, discrete cosine transform (DCT) and quantization, and eliminating temporal redundancies due to similarity between frames by motion compensation (MC).

Generally, there are chromatic or geometrical similarities between frames. In order to eliminate spatial redundancies, it is required to find out important elements and remove those elements that are less important. According to experiments, the human eye is more sensitive to luminance than chrominance. Thus, the MPEG 2 standard, which symbolizes luminance (a.k.a. luma) with Y and chrominance (a.k.a. chroma) with Cr and Cb, reduces signal volume by decreasing chrominance sampling. The MPEG 2 standard defines three sampling modes—4:2:0, 4:2:2, and 4:4:4—which represent three different chroma sampling frequencies. For instance, 4:2:0 mode means sampling 4 Y blocks (each block 8*8 pixels), 1 Cr block (8*8 pixels) and 1 Cb block (8*8 pixels) from a macro block the size of 16*16 pixels. By reducing the chroma sampling frequency, data compression can be optimized.

Video data is actually a continuous series of still frames, which are perceived as a moving picture due to the persistence of images in the vision of human eyes. The frames have a very short time interval, and there is only small difference between neighboring frames. Therefore, the MPEG 2 standard eliminates temporal redundancies due to similarity between frames by motion compensation (MC). The method described above is well known by a person skilled in the art.

Please refer to FIG. 1 showing a conventional video encoder 10. The video encoder 10 includes a DCT device 12, a motion estimator and compensator 14, a quantizer 16, a variable length encoder (VLE) 18, and a rate controller 20. The video encoder 10 utilizes the DCT device 12 and the quantizer 16 to eliminate spatial redundancies and the motion estimator and compensator 14 to eliminate temporal redundancies in order to compress the digital video data. The compressed data is then encoded by the VLE 18 and sent to a system multiplexer (not shown) to output the data in a transport stream or program stream as defined by the MPEG 2 standard.

The DCT device 12 performs DCT operation to every block (each block includes 8*8 pixels) sampled from a macro block in order to transform the video data from a spatial domain to a frequency domain. The DCT operation is a completely reversible mathematical operation. A DCT coefficient obtained after transforming the chroma of the block remains as an 8*8 two-dimensional matrix. Generally, there is hardly any intensive change of colors in a frame; thus the DCT coefficient standing for higher spatial frequency in the matrix is small or even 0. Basically, DCT operation does not reduce data volume but instead transforms the data in a format where redundancies can be more easily found.

Subsequently, the quantizer 16 quantizes the DCT coefficient to further compress the video data. Quantization is to reduce the description of the bit number of each coefficient; that is, each coefficient is described in a less precise unit. Quantization makes a value close to 0 become 0 and reduces the distribution of coefficients that are not 0 for a better performance on data compression. Quantization is a sort of damaging compression, which means the data quantized is not the same as the original. Therefore, the distortion resulting from compression is dependent on the selection of quantization scale.

The rate controller 20 in the video encoder 10 is for adjusting the quantization scale of the quantizer 16 according to a predetermined output bit rate range of the video encoder 10. The rate controller 20 adjusts the quantization scale for a macro block; that is, every block sampled from a macro block has the same quantization scale.

After quantization by the quantizer 16, the video encoder 10 connects those DCT coefficients in the quantized two-dimensional matrix serially, turning it into a one-dimensional series by way of a specific algorithm, to create the series with the longest length of continuous 0's in order to optimize the data compression. Subsequently, the VLE 18 compresses the one-dimensional series to output a compressed bit stream, which is called an encoded bit stream.

Lowering the quantization scale of the quantizer 16 lowers the compression rate, which increases the image quality, but increases the bit rate of the encoded bit stream output by the VLE 18. In contrast, increasing the quantization scale of the quantizer 16 increases the compression rate, which lowers the image quality, but lowers the bit rate of the encoded bit stream output by the VLE 18. In the encoded bit stream, each quantization scale applied during encoding is represented by, for example, 7–8 bits. These bits are used for decoding the encoded bit stream.

Along with the description above, in the case that the output bit rate of the video encoder 10 is to be kept in a predetermined range, if the quantization scale varies too frequently, there may be a large number of bits used to record quantization scales in the encoded bit stream output by the video encoder 10. For instance, in the NTSC standard, there are 30 frames per second, and each frame has 1350 macro blocks. In this case, if the output bit rate of the video encoder 10 is 2 Mbps, the share of the output bit rate for each compressed macro block is only 49.3 bits. If the rate controller 20 varies the quantization scale for every macro block, around 14% (7/49.3=0.14) of the output bit rate is used for recording the quantization scale. Such arrangement of the bit rate is not efficient.

Therefore in the conventional video encoder 10, the more frequent the rate controller 20 varies the quantization scale, the more bits are wasted on recording the quantization scale, so the remaining bit rate available for recording video data itself is limited and the image quality is not satisfactory.

SUMMARY OF INVENTION

It is therefore an objective of the invention to provide methods and devices for controlling quantization scales while encoding video signals by limiting the number of changes in the quantization scales to solve the problems mentioned above.

According to an exemplary embodiment of the present invention, a method for controlling quantization scales when encoding video signals is disclosed comprising: obtaining a number of changes in the quantization scales of within a time period; generating a new quantization scale; and comparing the number of changes with a predetermined value to determine whether to replace a prior quantization scale with the new quantization scale; wherein when the number of changes exceeds the predetermined value, retain the prior quantization scale instead of replacing it with the new quantization scale.

According to the exemplary embodiment of the present invention, a video quantizing device for quantizing video signals to generate a quantized matrix is disclosed comprising: a rate controller for providing quantization scales; and a quantizer electrically connected to the rate controller for quantizing the video signals according to the quantization scales; wherein the rate controller obtains a number of changes in the quantization scales and compares it with a predetermined value during encoding the video signals, and when the rate controller generates a new quantization scale, if the number of changes in the quantization scales exceeds the predetermined value, the rate controller does not replace a prior quantization scale used in the quantizer with the new quantization scale.

According to the exemplary embodiment of the present invention, a method for encoding digital video signals, which includes a plurality of macro blocks, is disclosed comprising: encoding a current macro block using a first quantization scale; obtaining historical quantization scale variance; and determining whether to encode a next macro block using a second quantization scale instead of the first quantization scale according to the history quantization scale variance.

According to the exemplary embodiment of the present invention, an apparatus for encoding digital video signals, which includes a plurality of macro blocks, is disclosed. The apparatus comprises: a rate controller for providing a quantization scale; and a quantizer coupled for receiving the quantization scale to perform quantization to respective one of the macro blocks; wherein whether the quantization scale provided by the quantizer is replaced with a new value is determined by evaluating quantization scale variance of previously quantized macro blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
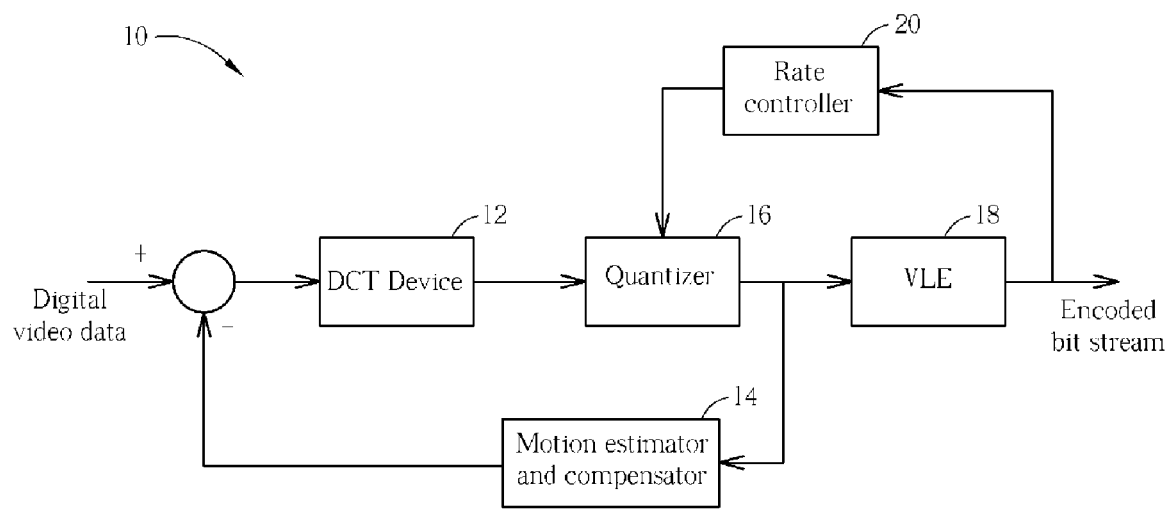
FIG. 1 illustrates a conventional video encoder.
Figure 2:
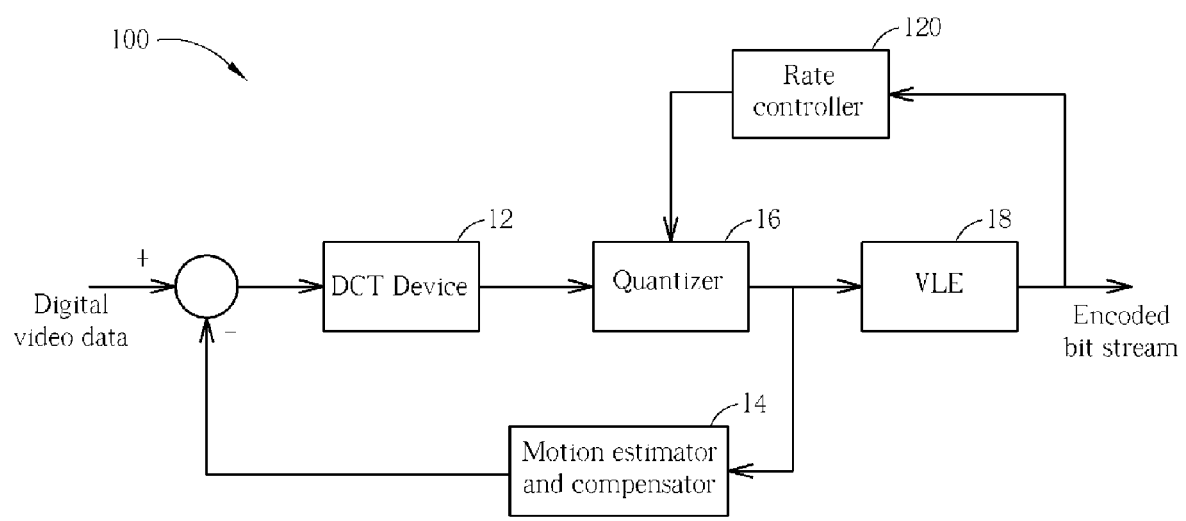
FIG. 2 illustrates a video encoder capable of controlling the number of changes in the quantization scales according to one embodiment of the present invention.

Please refer to FIG. 2 showing a video encoder 100 capable of controlling the number of changes in the quantization scales. Some components in the video encoder 100 could be similar to those in the conventional video encoder 10. These common components have the same numbering in this embodiment. The video encoder 100 uses a DCT device 12 and a quantizer 16 to eliminate spatial redundancies and a motion estimator and compensator 14 to eliminate temporal redundancies in order to compress video data. The compressed data can then be encoded by a VLE 18 to be output in form of an encoded bit stream.

The quantizer 16 quantizes a block according to a quantization scale determined by a rate controller 120. However in the present invention, the rate controller 120 can also determine whether to replace the original quantization scale with a new quantization scale according to the number of changes in the quantization scales during encoding.

Figure 3:
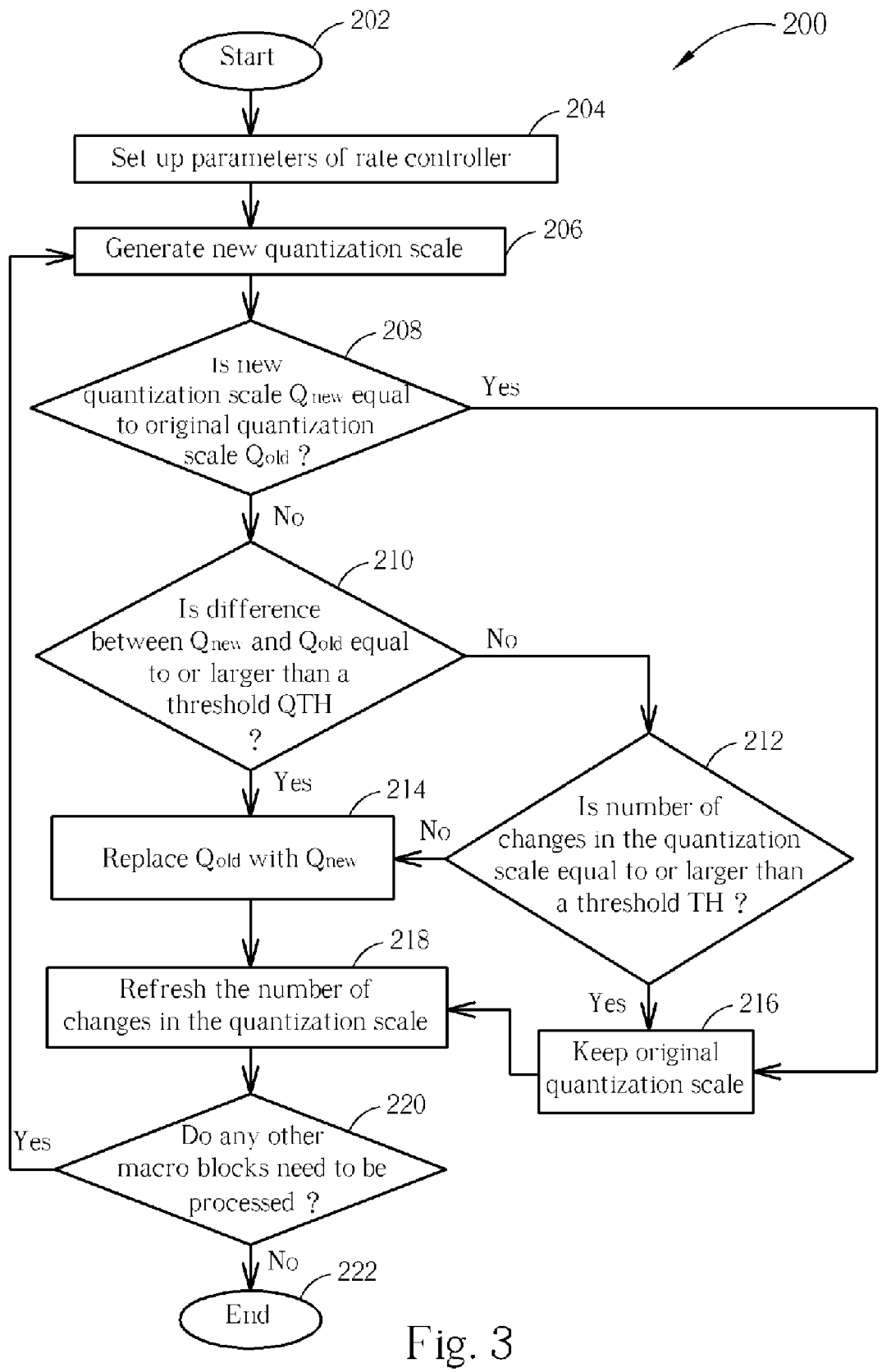
FIG. 3 depicts a flowchart illustrating the operation of controlling the quantization scale of a video signal according to one embodiment of the present invention.

Please refer to FIG. 3 showing a flowchart 200 of the video encoder 100 controlling the quantization scale of a video signal as follows:

Step 202: Start.

Step 204: Set up parameters required for rate controller 120's operation, such as timeframe P for calculating the number of changes in the quantization scales, initial value of the number of changes Chg_Q, upper limit TH of the number of changes in the quantization scales, and threshold QTH of the difference between successive quantization scales.

Step 206: The rate controller 120 generates a new quantization scale $Q_{new}$ corresponding to the next macro block.

Step 208: The rate controller 120 determines if the new quantization scale $Q_{new}$ is equal to the original quantization scale $Q_{old}$. If yes, go to Step 216; otherwise, go to Step 210.

Step 210: Calculate a difference between the new quantization scale $Q_{new}$ and the original quantization scale $Q_{old}$ and determine if it is equal to or larger than the threshold QTH. If yes, go to Step 214, and if no, go to Step 212.

Step 212: Determine if the number of changes in the quantization scales Chg_Q is equal to or larger than the upper limit TH. If yes, go to Step 216; otherwise, go to Step 214.

Step 214: The rate controller 120 passes the new quantization scale $Q_{new}$ to the quantizer 16 to replace the original quantization scale $Q_{old}$ with the new quantization scale. Go to Step 218.

Step 216: The rate controller 120 does not replace the original quantization scale $Q_{old}$ with the new quantization scale $Q_{new}$. The quantizer 16 utilizes the original quantization scale $Q_{old}$ for quantization.

Step 218: The rate controller 120 refreshes the number of changes in the quantization scales Chg_Q.

Step 220: Determine if any other macro blocks need to be processed. If yes, go to Step 206, otherwise, go to Step 222.

Step 222: End.

In the following description, the quantizer 16 is assumed to quantize a macro block L according to a quantization scale $Q_{old}$.

In Step 204, the video encoder 100 sets up the parameters required for rate controller 120's operation. For instance, set up a timeframe P for calculating the number of changes in the quantization scales for twenty macro blocks, which means calculating the number of changes in the quantization scales every time period of twenty macro blocks. Set up the upper limit TH of the number of changes in the quantization scales as ten, which means the number of changes in quantization scales can be up to ten times in a time period of twenty macro blocks. Set up the initial value of the number of changes in the quantization scales Chg_Q as zero, which means the rate controller 120 calculates the number of changes in the quantization scales starting from zero. Finally, set up the threshold QTH of the difference between successive quantization scales.

In Step 206, the rate controller 120 generates a new quantization scale $Q_{new}$ corresponding to the next macro block M to be quantized, which is next to the macro block L.

In Step 208, the rate controller 120 compares the new quantization scale $Q_{new}$ with the original quantization scale $Q_{old}$ to see whether they are equal to each other. If they are equal to each other, Step 216 is then performed. In Step 216, the rate controller 120 notifies the quantizer 16 to keep the original quantization scale $Q_{old}$ instead of passing the new quantization scale $Q_{new}$, which is the same as the original quantization scale $Q_{old}$, to the quantizer 16. Thus, the quantizer 16 quantizes the macro block M according to the original quantization scale $Q_{old}$. If the new quantization scale $Q_{new}$ does not equal to the original quantization scale $Q_{old}$, go to Step 210 to find the difference between the new quantization scale $Q_{new}$ and the original quantization scale $Q_{old}$.

In Step 210, the rate controller 120 checks whether the difference between the new quantization scale $Q_{new}$ and the original quantization scale $Q_{old}$ is larger than the threshold QTH; that is, to see if $|Q_{new}-Q_{old}| \geq QTH$. $|Q_{new}-Q_{old}|$ means that the difference between the new quantization scale $Q_{new}$ and the original quantization scale $Q_{old}$ which corresponds respectively to the macro block L and the macro block M, is larger than the threshold QTH. The quantization scale calculated by the rate controller 120 represents the complicacy of the macro blocks. The quantization scale difference between the macro block L and the macro block M being large generally indicates strong preference to the new quantization scale $Q_{new}$. Therefore, if the difference between the new quantization scale $Q_{new}$ and the original quantization scale $Q_{old}$ is larger than the threshold QTH, the rate controller 120 passes the new quantization scale $Q_{new}$ to the quantizer 16 for the next quantization without any limitations from the number of changes in the quantization scales Chq_Q. In Step 210, if the quantization scale difference is not larger than the threshold, i.e. $|Q_{new}-Q_{old}|<QTH$, go to Step 212 to determine whether or not to replace the original quantization scale $Q_{old}$ with the new quantization scale $Q_{new}$.

In Step 212, the rate controller 120 checks whether the number of changes in the quantization scales Chg_Q equals or is larger than the upper limit TH of 10. If the number of changes in the quantization scales Chg_Q is ten or larger than ten, the rate controller 120 notifies the quantizer 16 to maintain the original quantization scale $Q_{old}$ instead of passing the new quantization scale $Q_{new}$ to the quantizer 16. Thus, the quantizer 16 quantizes the macro block M according to the original quantization scale $Q_{old}$. Accordingly, in the encoded stream output by the VLE 18, the quantization scale does not vary during the quantization of the macro block M, and therefore additional bits (for example, 7 to 8 bits) for recording the new quantization scale $Q_{new}$ are saved.

If the number of changes in the quantization scales Chg_Q is less than ten, the rate controller 120 performs Step 214 to pass the new quantization scale $Q_{new}$ to the quantizer 16 so the quantizer 16 quantizes the macro block M according to the new quantization scale $Q_{new}$. Thus in the encoded stream output by the VLE 18, the new quantization scale $Q_{new}$ used for quantizing the macro block M is recorded with 7–8 bits.

In Step 218, regardless of whether the rate controller 120 replaces the original quantization scale $Q_{old}$ with the new quantization scale $Q_{new}$ or not, the rate controller 120 refreshes the number of changes in the quantization scales Chg_Q. It is noted that the timeframe P for calculating the number of changes in the quantization scales was set up as twenty macro blocks in Step 204; thus when refreshing the number of changes in the quantization scales Chg_Q, the rate controller 120 will remove the 20th macro block previous to the macro block M (i.e. the farthest previous macro block from the current macro block M being processed) and add the macro block M into calculation, where it will sum up the number of changes in the quantization scales of the macro block M and its previous nineteen macro blocks, which serves as the refreshed Chg_Q.

Step 220 is to determine if any other macro blocks need to be quantized after the macro block M. If the macro block M is the last macro block, end the flow. If there are still other macro blocks need to be quantized, the rate controller 120 generates a quantization scale corresponding to the next macro block N before going back to Step 206 and repeating the steps described above.

The sequence for performing Step 204 and Step 206 is not limiting. Step 204 could be performed prior or after Step 206. Moreover, in this embodiment it is assumed that the timeframe P for calculating the number of changes in the quantization scales is twenty macro blocks, the upper limit TH of the number of changes in the quantization scales is ten, the initial value of the number of changes in the quantization scales Chg_Q is zero, and the threshold of the difference in the quantization scale range is QTH. These parameters are only for illustrative purpose and should not be taken as a limitation to the present invention and could be adjusted as required. For instance, the timeframe P for calculating the number of changes in the quantization scales could be other specific period of time; the upper limit TH of the number of changes in the quantization scales could be any number larger than 0, and could be either integer or non-integer number; the initial value of the number of changes in the quantization scales Chg_Q could be zero or any other numbers; and the threshold of the difference in the quantization scale range can be a specific value or a specific percentage. It is also possible to write those required parameters into a firmware controlling the rate controller 120 in advance.

In the above embodiment, the difference between the new quantization scale $Q_{new}$ and the original quantization scale $Q_{old}$ is checked, and the historical changes in the quantization scales Chg_Q is also evaluated to determine whether or not to replace the original quantization scale $Q_{old}$ with the new quantization scale $Q_{new}$. In another embodiment, Step 210 can be omitted; that is, when the new quantization scale $Q_{new}$ does not equal to the original quantization scale $Q_{old}$, only historical changes in the quantization scales Chg_Q are evaluated to determine whether or not to replace the original quantization scale $Q_{old}$ with the new quantization scale $Q_{new}$. Other combinations of the quantization difference and/or the historical changes in the quantization scales are also feasible according to the spirit of the invention.

In contrast to the related art, the rate controller 120 according to the present invention can limit the number of changes in the quantization scales during encoding digital video data in order to reduce the bit volume for recording the quantization scale in the encoded bit stream. Therefore more bits are available for recording the digital video data itself, and better image quality can be achieved.

The above description relates to the video encoder 100. The video encoder 100 could be realized in an integrated semiconductor chip. The encoder 100 could also be realized in a computer system, and the DCT device 12, the motion estimator and compensator 14, the quantizer 16, the VLE 18 and the rate controller 120 could be respectively programs or an integrated encoding program. In this case, the flowchart 200 shown in FIG. 3 is the algorithm of the encoding program with a program code edited by any program language.

Those skilled in the art will readily observe that numerous modifications and alterations of the method and device may be made while retaining the teachings of the invention. Accordingly, the above disclosure should be construed as limited only by the metes and bounds of the appended claims.

What is claimed is:

1. A method for controlling quantization scales when encoding video signals, comprising:
   (a) obtaining a number of changes in the quantization scales of within a time period;
   (b) generating a new quantization scale; and
   (c) comparing the number of changes with a predetermined value to determine whether to replace a prior quantization scale with the new quantization scale; wherein when the number of changes exceeds the predetermined value, retain the prior quantization scale instead of replacing it with the new quantization scale.

2. The method of claim 1 wherein the predetermined value is a specific number of changes in the quantization scales within the time period.

3. The method of claim 1 wherein the predetermined value is a specific number of changes in the quantization scales during the quantization of a predetermined number of macro blocks in the video signals.

4. The method of claim 1 wherein the method further comprises performing steps (a) and (b) using a rate controller.

5. The method of claim 1 wherein the method further comprises performing steps (a) and (b) by executing a video encoding program.

6. The method of claim 1 wherein the method further comprises comparing the new quantization scale with the prior quantization scale, and if the difference between the new quantization scale and the prior quantization scale exceeds a predetermined range, even if the number of changes in the quantization scales has exceeded the predetermined value, replace the prior quantization scale with the new quantization scale.

7. The method of claim 1 wherein the method further comprises comparing the new quantization scale with the prior quantization scale, and if the difference between the new quantization scale and the prior quantization scale does not exceed a predetermined range, comparing the number of changes in the quantization scales with the predetermined value to determine whether or not to replace the prior quantization scale with the new quantization scale.

8. The method of claim 1 wherein the time period is a predetermined duration or a specific period required for quantizing a predetermined number of macro blocks in the video signals.

9. A video quantizing device for quantizing video signals to generate a quantized matrix comprising:
   a rate controller for providing quantization scales; and
   a quantizer electrically connected to the rate controller for quantizing the video signals according to the quantization scales;
   wherein the rate controller obtains a number of changes in the quantization scales and compares it with a predetermined value during encoding the video signals, and when the rate controller generates a new quantization scale, if the number of changes in the quantization scales exceeds the predetermined value, the rate controller does not replace a prior quantization scale used in the quantizer with the new quantization scale.

10. The device of claim 9 wherein the predetermined value is a specific number of changes in the quantization scales within a time period.

11. The device of claim 9 wherein the predetermined value is a specific number of changes in the quantization scales during the quantization of a predetermined number of macro blocks in the video signals.

12. The device of claim 9 wherein the rate controller compares the new quantization scale with the prior quantization scale, and if the difference between the new quantization scale and the prior quantization scale exceeds a predetermined range, even if the number of changes in the quantization scales has exceeded the predetermined value, the rate controller still provides the new quantization scale to the quantizer to replace the prior quantization scale.

13. The device of claim 9 wherein the rate controller compares the new quantization scale with the prior quantization scale, and if the difference between the new quantization scale and the prior quantization scale does not exceed a predetermined range, the rate controller compares the number of changes in the quantization scales with the predetermined value to determine whether or not to replace the prior quantization scale with the new quantization scale.

14. A method for encoding digital video signals, the digital video signals including a plurality of macro blocks, the method comprising:
   (a) encoding a current macro block using a first quantization scale;
   (b) obtaining historical quantization scale variance; and
   (c) determining whether to encode a next macro block using a second quantization scale instead of the first quantization scale according to the history quantization scale variance.

15. The method of claim 14, wherein the step (b) is performed by counting a number of quantization scale changes within a given time period or within a time period required for quantizing a predetermined number of macro blocks.

16. The method of claim 15, wherein the step (c) is performed by comparing the number of quantization scale changes within a given period of time with a predetermined value.

17. The method of claim 14, wherein the step (c) further comprises determining whether to encode the next macro block using the second quantization scale instead of the first quantization scale according to the history quantization scale variance and a difference between the first quantization scale and the second quantization scale.

18. An apparatus for encoding digital video signals, the digital video signals including a plurality of macro blocks, the apparatus comprising:
   a rate controller for providing a quantization scale; and
   a quantizer coupled for receiving the quantization scale to perform quantization to respective one of the macro blocks;
   wherein whether the quantization scale provided by the quantizer is replaced with a new value is determined by evaluating quantization scale variance of previously quantized macro blocks.

19. The apparatus of claim 18, wherein when the quantization scale variance of the previously quantized macro blocks exceeds a first threshold, the quantization scale provided by the quantizer is not replaced by the new value.

20. The apparatus of claim 18, wherein when the new value is significantly different from a prior value, the quantization scale provided by the quantizer is replaced with the new value even if the quantization scale variance of the previously quantized macro blocks exceeds the first threshold.

21. The apparatus of claim 18, wherein the evaluating quantization scale variance of previously quantized macro blocks is performed by counting a number of quantization scale changes within a given time period or within a time period required for quantizing a predetermined number of macro blocks.

* * * * *